June 2, 1942.  L. F. CLERC  2,285,110
REFRIGERATED DISPLAY CABINET
Filed May 1, 1939  8 Sheets-Sheet 2

Fig. II.

Inventor.
Leonard F. Clerc
By Williams, Bradbury,
McCaleb & Hinkle
Attys

June 2, 1942.  L. F. CLERC  2,285,110
REFRIGERATED DISPLAY CABINET
Filed May 1, 1939   8 Sheets-Sheet 3

June 2, 1942.  L. F. CLERC  2,285,110
REFRIGERATED DISPLAY CABINET
Filed May 1, 1939  8 Sheets-Sheet 4

June 2, 1942.  L. F. CLERC  2,285,110
REFRIGERATED DISPLAY CABINET
Filed May 1, 1939  8 Sheets-Sheet 5

June 2, 1942.  L. F. CLERC  2,285,110
REFRIGERATED DISPLAY CABINET
Filed May 1, 1939  8 Sheets-Sheet 6

June 2, 1942. L. F. CLERC 2,285,110
REFRIGERATED DISPLAY CABINET
Filed May 1, 1939 8 Sheets-Sheet 7

June 2, 1942.                L. F. CLERC                 2,285,110
                     REFRIGERATED DISPLAY CABINET
                         Filed May 1, 1939          8 Sheets-Sheet 8

Inventor.
Leonard F. Clerc
By Williams, Bradbury,
McCaleb & Hinkle
Attys.

Patented June 2, 1942

2,285,110

UNITED STATES PATENT OFFICE 2,285,110

REFRIGERATED DISPLAY CABINET

Leonard F. Clerc, Chicago, Ill.

Application May 1, 1939, Serial No. 271,077

1 Claim. (Cl. 312—134)

My invention relates generally to refrigerated display cabinets, and more particularly to improvements in cabinets of this type whereby the food products which are contained in the cabinet are readily accessible, so that the cabinet may be used for a self-service in grocery stores and the like.

It is an object of my invention to provide an approved refrigerated display cabinet in which is incorporated a conveyor carrying the food past doors which may be opened by the customer desiring to purchase food products carried by the conveyor.

A further object is to provide a food display cabinet in which a large variety of food products may be stored and displayed, and in which the food products move past doorways through which they may be removed from the cabinet, and in which the kind of food product adjacent the doorway is indicated to the customer.

A further object is to provide a refrigerated display cabinet in which access to the cabinet is obtained through relatively small doors located near the top of the cabinet, whereby the transfer of heat to the interior of the cabinet upon opening the doors is at a low rate.

A further object is to provide an improved refrigerated food display cabinet in which is provided a food storage chamber which may be elevated to obtain access to the food stored therein.

A further object is to provide a refrigerated display cabinet incorporating power operated means for conveying the contents of said cabinet past doorways formed therein, and arresting the operation of the conveying means whenever any one of the doors is opened.

A further object is to provide an improved refrigerated display cabinet in which the contents may be maintained at a uniformly low temperature.

A further object is to provide an improved refrigerated display cabinet in which a large quantity of packaged food products may be stored and displayed, and in which access may be had directly to any particular package.

A further object is to provide an improved food product conveying means for use in display cabinets.

A further object is to provide an improved control means for a conveyor driving mechanism whereby said conveyor may readily be stopped in any desired position with respect to the doors.

A further object is to provide an improved refrigerated display cabinet which is of relatively simple construction, may be economically operated, and which will be effective to maintain food products at any desired low temperature.

Other objects will appear from the following description, reference being had to the accompanying drawings in which.

General description

It is believed that a clear understanding of the detailed description of the cabinet will be more readily obtained if it is prefaced with this brief general description of the invention.

The cabinet consists of thoroughly heat-insulated walls, and may be considered as divided into three general sections. One section contains the refrigerating unit, a blower, and a conveyor driving mechanism, together with the motors and controls therefor. The second section constitutes the food cabinet proper, and has incorporated therein a conveyor carrying a plurality of trays or baskets, in which the food to be sold is placed. This conveyor moves the trays relatively slowly through a closed circuit, past manually openable doors located in the top of the cabinet along both sides thereof. These doors may be opened by the customer, and the operation of the conveyor arrested so that the customer may conveniently withdraw products from the trays or baskets carried by the conveyor, the conveyor being arrested during the time that any one of the doors is opened. An indicator which may carry legends giving the prices and descriptive of the products contained in the various trays or baskets is operated in synchronism with the conveyor, so as to indicate the particular product which is in the trays adjacent the doors. The third section of the cabinet comprises a storage compartment containing a plurality of shelves which may be elevated above the plane of the top of the cabinet to enable the groceryman readily to remove and replace food products therein. Manually controlled power operated means are provided for elevating and lowering this storage cabinet.

The main food containing section of the cabinet is cooled by means of a blast of cold air circulated in series through the food containing chamber and past a heat transfer apparatus, in which surplus moisture is removed from the air, and the air lowered to a temperature sufficient to preserve the particular food products in the cabinet. The heat transfer device may be cooled by any suitable type of refrigerating unit, and is so constructed that in the event of failure of the refrigerating system, dry ice may be utilized as a refrigerating medium.

The cabinet is equipped with suitable thermostatic switch operated controls, whereby the air circulating blower is operated only when necessary to maintain a predetermined low temperature, and the refrigerating unit is similarly supplied with the usual controls for regulating its operation.

Detailed description of cabinet

Figure 1:
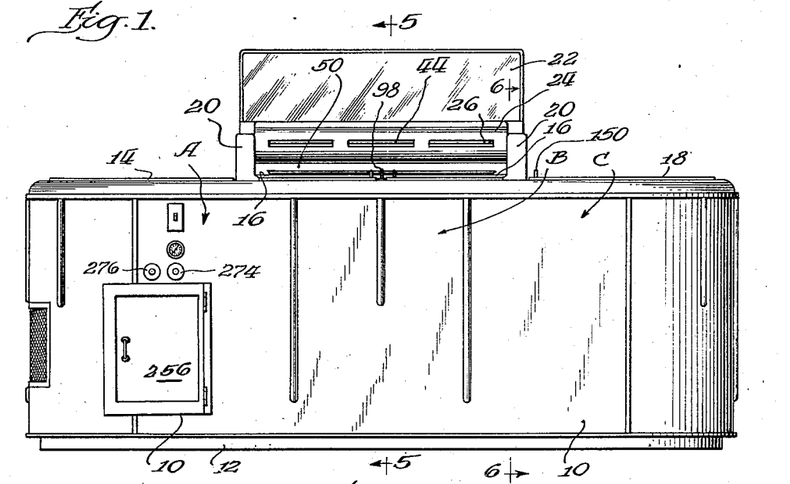
Figure 1 is a front elevation of the cabinet.
Figure 2:
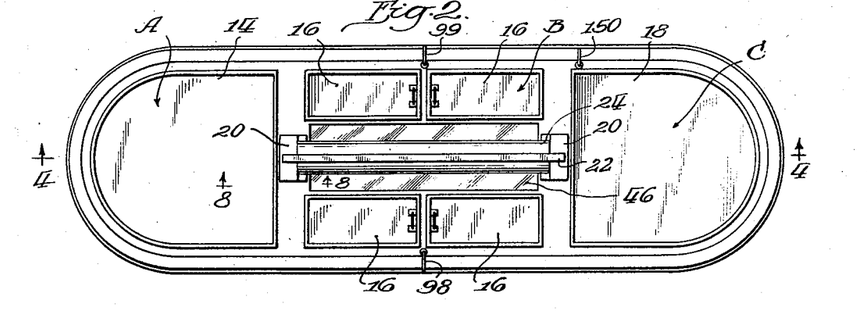
Figure 2 is a plan view thereof.

The cabinet consists of a well insulated container, preferably of the shape shown in Figs. 1 and 2, and comprising an outer wall 10 of sheet metal supported upon a structural iron frame. The cabinet is preferably raised above the floor by a short pedestal 12 so as to provide a space for the toes of persons removing products from the cabinet. Referring to Figs. 1 and 2, the cabinet may be divided generally into three sections: A, B and C, access to section A being obtained through a hinged cover 14, access to section B being obtained through any one of four hinged doors 16, and section C comprising a separate storage cabinet having a top 18, the storage cabinet being capable of being elevated above the top of the remainder of the cabinet to obtain access thereto. The cabinet is provided with standards 20 supporting a panel 22 for the reception of advertising indicia, and for supporting a housing 24 having windows 26 through which the indicia on an indicating drum may be observed.

Figure 4:
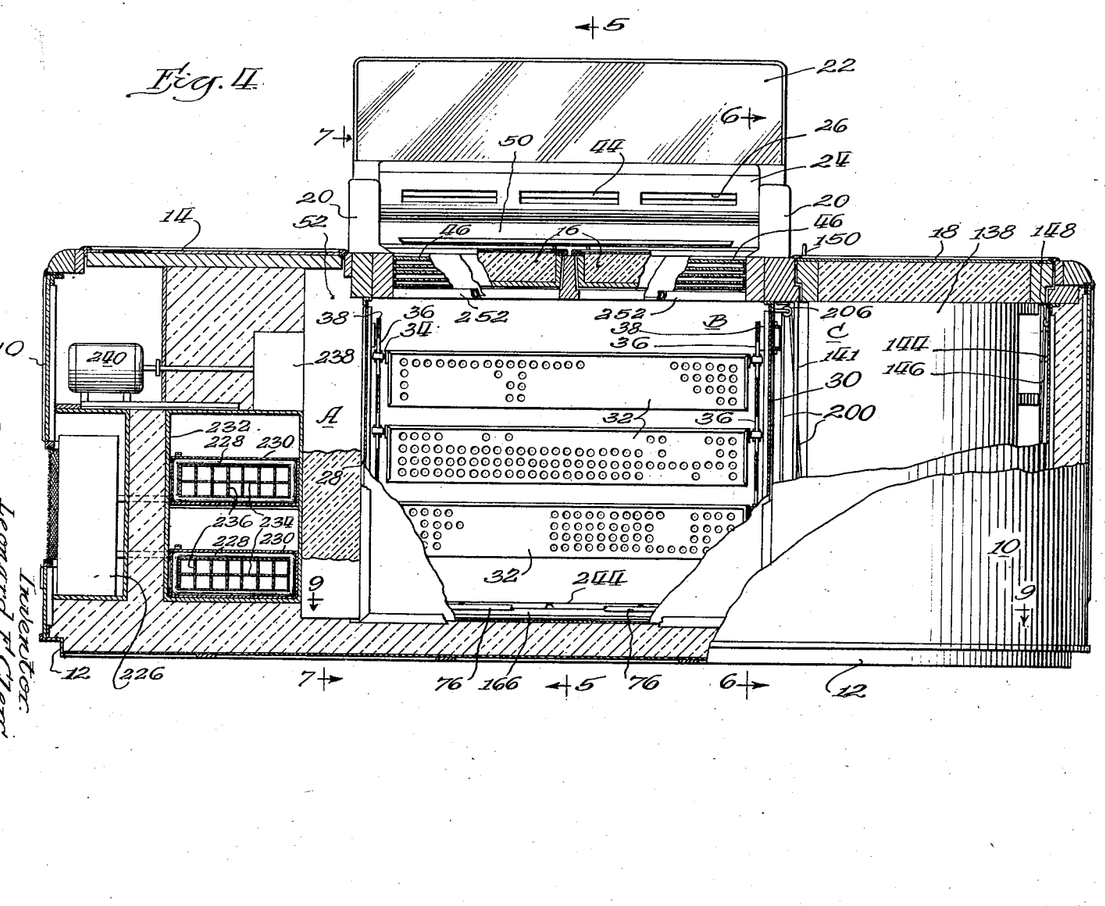
Figure 4 is a central vertical longitudinal sectional view of the cabinet, taken substantially on the line 4—4 in Figure 2.
Figure 5:
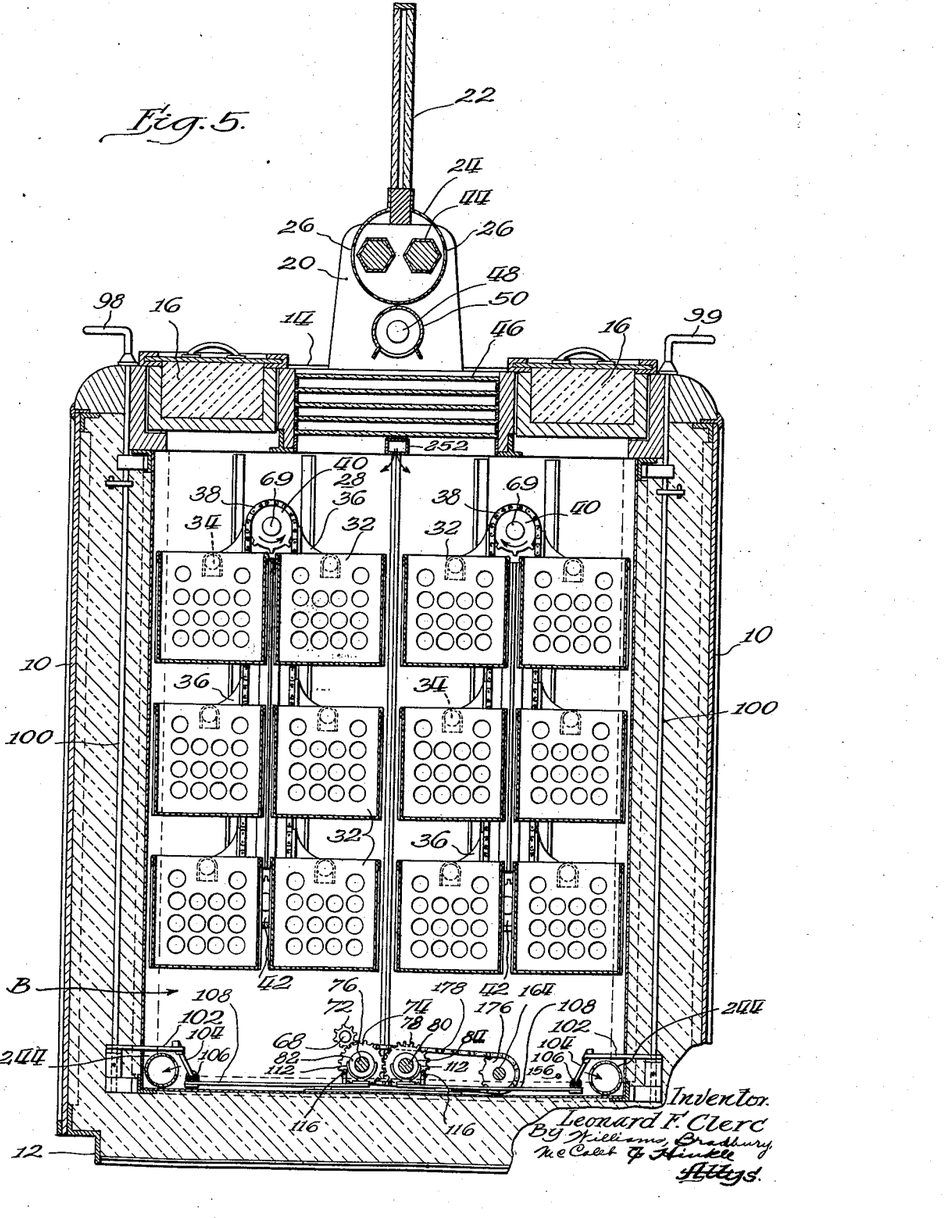
Figure 5 is a vertical transverse sectional view, taken substantially on the line 5—5 of Figure 1.
Figure 6:
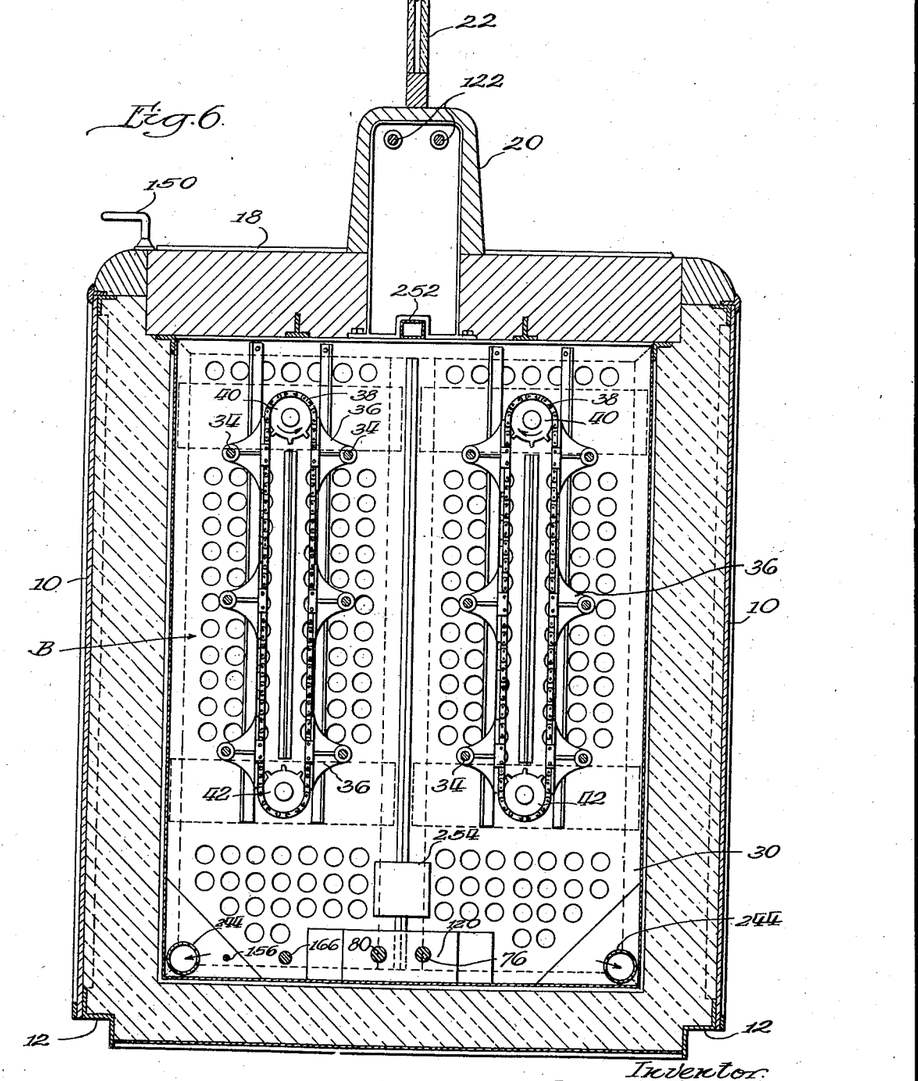
Figure 6 is a view similar to Figure 5, taken on the line 6—6 of Figure 1.

Referring to the middle section B, as best shown in Figs. 4, 5 and 6, this section is separated from the remaining sections by end partition walls 28 and 30, the end wall 30 being suitably perforated (Fig. 6) so as to afford communication between the center section B and section C.

Within the section B are a plurality of food-carrying trays or baskets 32, which are preferably made of perforated sheet metal or other reticulated or foraminated metal so as to permit relatively free circulation of air through the walls thereof. The ends of the trays have bearing studs 34 secured thereto adjacent the top thereof, these studs projecting into bearing apertures formed in brackets 36 which are secured to a chain 38 in suitable spaced relation with respect to one another. The chains 38 mesh with sprockets 40, 42. In the construction illustrated, there are twelve trays arranged in two groups of six each, each group being supported and moved by a pair of chains 38. The trays are adapted to be moved past the doors 16 which, upon being raised, permit the customer to remove articles of food from the trays. By suitable control means hereafter to be described, the customer may control the movement of the trays and stop the trays when a tray containing the particular food desired is adjacent the door 16, the contents of the trays being determined by observation of the signs on indicators 44 which are rotated in synchronism with the trays 32, and the indicia of which are observable through the windows 26. The contents of the trays may be observed through a window 46 which comprises a plurality of panes of glass hermetically sealed with respect to one another, so as to prevent frosting due to the admission of moist air between the panes. The chamber is illuminated by a lamp 48, provided with a suitable generally tubular reflector 50.

Figure 7:
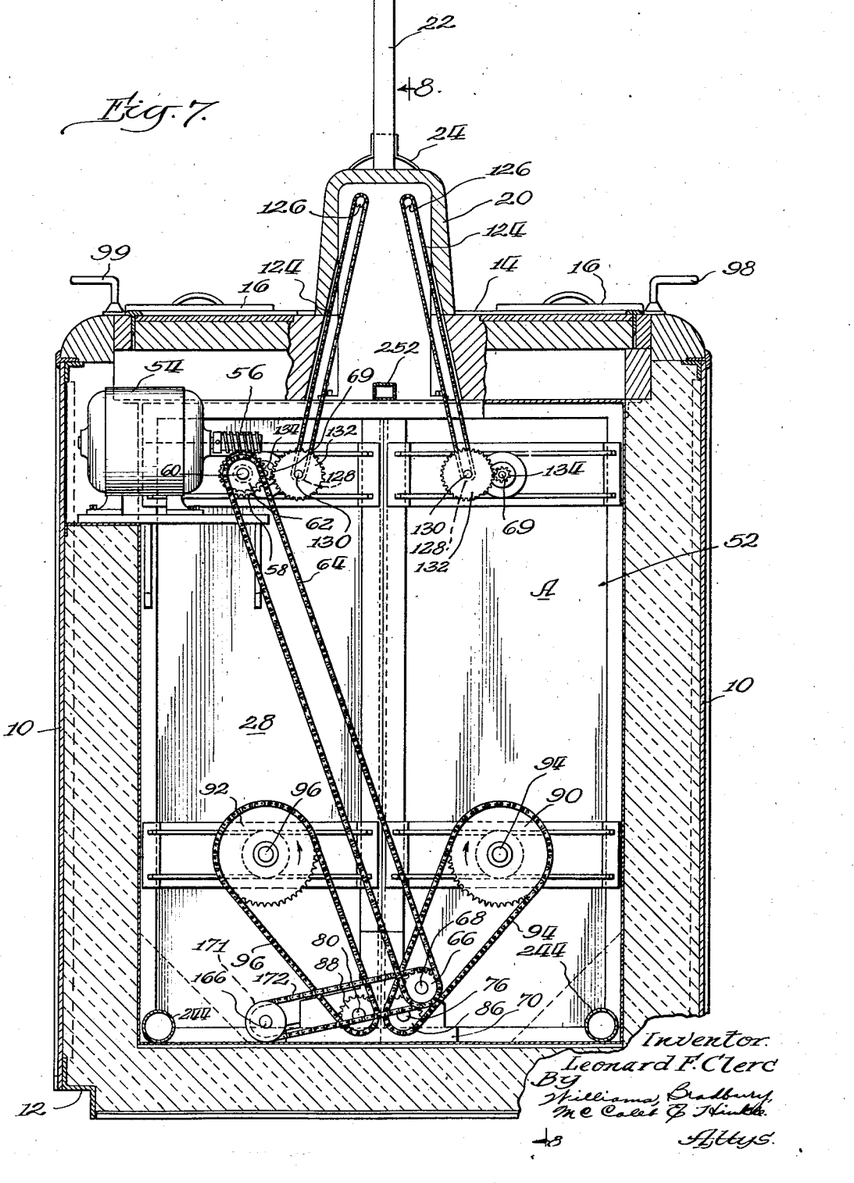
Figure 7 is a vertical transverse sectional view, taken on the line 7—7 of Figure 4.
Figure 8:
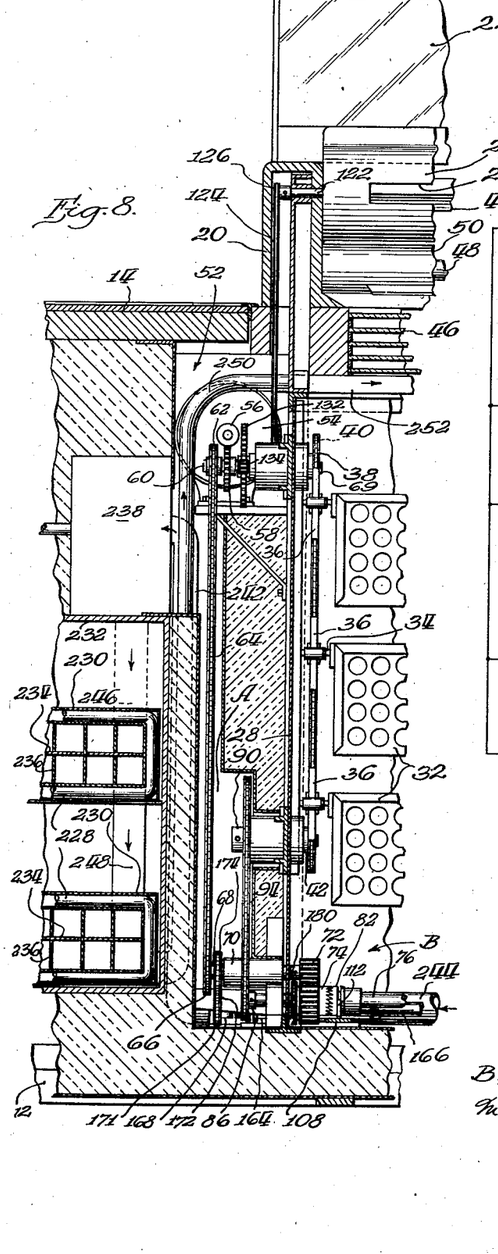
Figure 8 is a fragmentary sectional view, taken on the line 8—8 of Figure 2, and showing particularly the conveyor driving mechanism.
Figure 9:
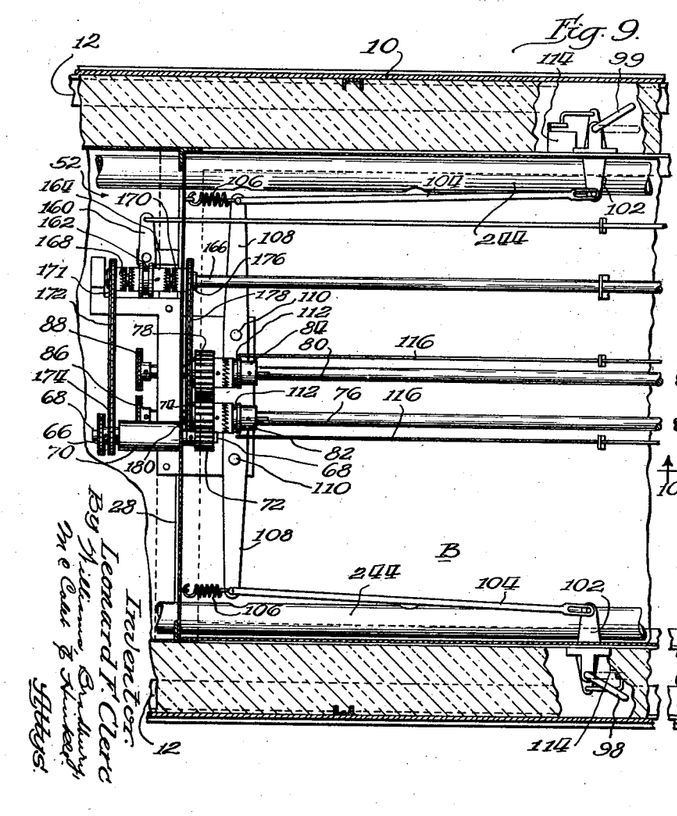
Figure 9 is a horizontal sectional view taken on the line 9—9 of Figure 4, and showing particularly the mechanism for elevating the storage compartment, and for controlling the operation of the conveyor.

Most of the apparatus for moving the trays is contained in a closed compartment 52, and is best shown in Figs. 7, 8 and 9. This driving means consists of an electric motor 54 which, through a worm 56, drives a worm gear 58. The worm gear 58 is fixed to a shaft 60, which carries a sprocket 62, which latter, through a chain 64, drives a sprocket 66. The sprocket 66 is secured to a shaft 68 which extends through the wall 28 being supported by a bearing 70 and at its inner end, in the compartment B, carries a gear 72 which meshes with a gear 74, the latter being rotatably mounted on a shaft 76. The gear 74 meshes with a similar gear 78 freely rotatable on a shaft 80. The gears 74 and 78 have jaw clutches formed in their hubs, which cooperate with slidable jaw clutch members 82 and 84, respectively, the latter being mounted to rotate with the shafts 76 and 80, respectively, being rotatably connected therewith by means of feather keys or the like. The ends of the shafts 76 and 80 carry sprockets 86 and 88, respectively, these sprockets driving larger sprockets 90 and 92 through chains 94 and 96 respectively. The sprockets 90 and 92 are mounted on stub shafts 94 and 96 respectively, which at their inner ends carry the previously mentioned sprockets 40 and 42, thereby moving the trays 32. The opposite (right hand Fig. 9) ends of the shafts 76 and 80 carry sprockets 87 and 89 respectively, which through chains and sprockets, similar to the chains 94, 96 and sprockets 90, 92 drive the lower sprockets 42 at the right hand (Fig. 10) end of the section B. The chains 38 at the opposite ends of one group of trays are thus driven in synchronism from a common shaft 76 or 80.

The two groups of trays are, however, separately controlled by means of handles 98, 99 which are suitably mounted adjacent the doors 16. Each of the handles 98, 99 is secured to the end of a rod 100 which at its lower end has an arm 102 rigidly secured thereto. A pull rod 104 is connected to each of the levers 102 by a suitable lost motion pin and slot connection, and is normally pulled to the left (Fig. 9) by a tension spring 106, the left hand end of each of the rods 104 being pivotally connected to the end of a lever 108 suitably pivoted upon a pin 110. The levers 108 carry yokes 112 which are rotatable with respect to the jaw clutch members 82 and 84. By clockwise rotation of the handle 98 the jaw clutch member 82 may be brought into engagement with the complemental jaw clutch member formed on the hub of gear 74, and the shaft 76 is thus connected to the source of power, for moving the group of trays which are adjacent the handle 98. In a similar manner, the handle 99 controls the movement of the group of trays adjacent it. Each of the handles, in addition to operating its associated jaw clutch member, is effective when operated as described to close a switch 114 which, as will hereinafter appear, controls the supply of current to the motor 54.

In order to prevent the movement of a group of trays under the force of gravity, assuming that the trays are unequally loaded, each of the levers 108 is adapted to move a locking rod 116 into engagement with notches formed in locking discs 118 which are rigidly secured to the shafts 76 and 80. Thus, when either of the jaw clutch members 82 or 84 is disengaged, the associated group of trays is held against movement. It will be noted that the ends of the rods 116 are guided and supported by a bracket 120 which is secured to the end wall 30.

The indicators 44 are mounted upon shafts 122 which are driven by chains 124 meshing with sprockets 126 secured to the ends of the shafts 122. The chains 124 also mesh with sprockets 128 carried on shafts 130, which also have secured thereto gears 132 which mesh with pinions 134 secured to the stub shafts 69.

Storage compartment elevator

The storage compartment comprises a suitable cabinet conformed to the shape of section C and including a plurality of shelves 136 suitably supported in a cabinet 138. The cabinet 138 has the cover 18 rigidly secured thereto and is adapted for elevation, structurally built up guide-ways 140 forming channels for the reception of the legs 142 of T-shaped bars secured to the side walls of the cabinet. The cabinet is also guided for vertical movement by a channel 141 which receives and forms a track for a roller 143 which is attached to the cabinet 138.

The cabinet is counterbalanced by a weight 144 which is carried at the end of a cable 146, the cable extending about a pulley 148 and being attached to the lower end of the cabinet 138 by means of a bracket 149. Additional counterweights may be provided. The cabinet 138 is elevated and lowered by power operated means controlled by handle 150 which is secured to a rod 152, the lower end of the rod having an arm 154 rigidly secured thereto. The arm 154 has a rod 156 pivotally secured at its extremity, this rod being suitably guided through section B of the cabinet and having its left hand (Fig. 9) end pivotally secured to a lever 160 which carries a yoke 162 for shifting a double jaw clutch member 164 longitudinally on a shaft 166. The jaw clutch member 164 is slidably keyed to the shaft 166 and is adapted alternatively to engage jaw clutch members 168 and 170. The jaw clutch member 168 may be part of the hub of a sprocket 171 which is driven by a chain 172, the chain 172 being in turn driven from the shaft 68 through a sprocket 174. The clutch member 170 may be formed integrally with the hub of a sprocket 176 which is driven through a chain 178 from a sprocket 180 carried by the shaft 76.

The clutch members 168 and 170 thus rotate in opposite directions, and upon engagement of the double jaw clutch member 164 with the clutch member 168 the shaft 166 is rotated in one direction, while when the clutch member 164 is engaged with the clutch member 170, the shaft 166 is rotated in the opposite direction.

The right hand end (Fig. 9) of shaft 166 is supported in a suitable bearing bracket 182 and carries a bevel pinion 184 at its extremity. The bevel pinion 184 meshes with a bevel gear 186 carried on a shaft 188, likewise supported in the bearing bracket 182 and having a pinion 190 keyed thereto. The pinion 190 meshes with a spur gear 192 which is rigidly secured to a shaft 194 similarly supported in the bearing bracket 182 as well as in bearings formed in brackets 194 and 196.

Figure 3:
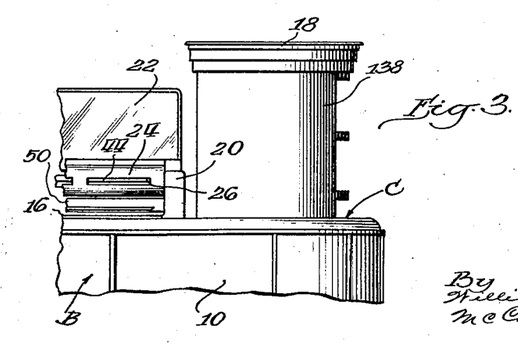
Figure 3 is a fragmentary side elevation of one end of the cabinet, showing the food storage compartment in elevated position.
Figure 10:
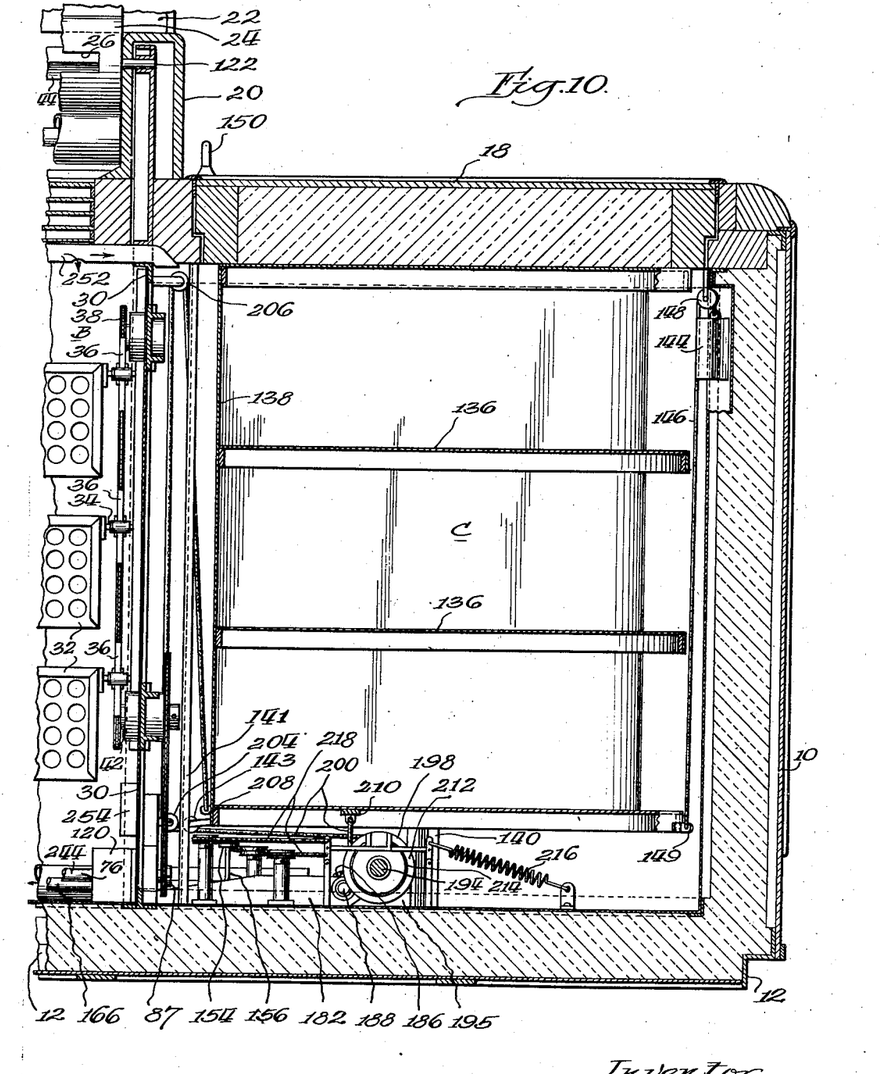
Figure 10 is a central vertical sectional view in a plane extending longitudinally of the cabinet, and taken on the line 10—10 of Figure 9.

The shaft 194 carries a winding drum 198 which, through the gear train just described, may be rotated in either direction as desired. The winding drum 198 has a cable 200 anchored thereto at a central point 202, one end of the cable extending around sheaves 204 and 206 and being secured at its extremity to a bracket 208 attached to the bottom of the cabinet 138. The other end of the cable 200 is attached to an anchor bracket 210 secured to the bottom of the cabinet 138. From the foregoing description of the drum and cable, it will be apparent that rotation of the winding drum 198 in one direction will cause elevation of the cabinet 138 to the position in which it is shown in Fig. 3, while rotation of the winding drum 198 in the opposite direction will cause the cabinet 138 to be lowered to the position in which it is shown in Fig. 10. It is necessary thus positively to elevate and lower the cabinet because of the fact that in some instances its weight plus that of its contents may not be fully counterbalanced by the weight or weights 144; while in other instances when the cabinet is empty or substantially empty, the weights 144 may more than counterbalance the weight of the cabinet, thus requiring the application of a force to lower it.

Means are provided to hold the cabinet 138 in any position to which it may be elevated. This means comprises a braking device 212 which is operable upon a brake drum 214 formed integrally with the winding drum 198, the brake device being normally held in braking position by a tension coil spring 216. Whenever the handle 150 is operated either to raise or lower the cabinet 138, it is effective through the attachment of its lever 154 with a cable 218 to release the brake device 212. Operation of the handle 150 to cause elevation or lowering of the cabinet also closes a switch 220, which is connected in parallel with the switches 114, and when closed, energizes the motor 54.

Refrigerating system

The apparatus for cooling the air in sections B and C of the cabinet is preferably a motor driven mechanical refrigerating unit which may be of any well known construction. Means are preferably provided whereby dry ice may be used as the refrigerating medium, so that in the event of failure of the mechanical refrigerating unit, the low temperature in the cabinet may be maintained by the use of dry ice. The system is preferably of such nature that the carbon dioxide evaporating from the dry ice is permitted to escape to the atmosphere instead of being allowed to flow into the food compartments of the cabinet.

As shown more or less diagrammatically in Fig. 4, there is a mechanical refrigerating unit 226 located in section A of the cabinet, having its evaporator coils 228 enclosed in double walled open end tanks 230, which in turn are suitably supported within a housing 232, the tanks 230 being preferably filled with a liquid having a low freezing point, such as alcohol, and thus facilitating the transfer of heat from the inner walls of the tanks 230 to the air which flows through circuitous passageways formed within the tank by removable horizontal separator plates 234 and vertical separator plates 236. The tanks 230 and the separator plates which form the walls of the long circuitous passageways through the tanks may be of the construction shown in my copending application, Serial No. 256,028, filed February 13, 1939.

Air drawn from the food compartment in section B of the cabinet is forced successively through the circuitous passageways of the two tanks by a blower 238 which is driven by a motor 240. The blower draws air upwardly through a conduit 242 (Fig 8), which is branched and connected to apertured conduits 244, the latter extending longitudinally of the section B adjacent to and at the sides of the bottom thereof. The air thus drawn from the food compartment of the cabinet through the conduits 244 and 242 is ejected under pressure through a conduit 246 into the circuitous passageway in the uppermost of the two tanks 230, from which the air flows through a conduit 248 to the circuitous passageway in the lower of the two tanks 230. After circulating through the circuitous passageways, the air is forced upwardly through the conduit 250, the latter conduit terminating in a horizontal apertured conduit 252 which extends along the top of the food compartment in section B at the center thereof. The end of the conduit 252 extends through the end partition wall 30, as shown in Fig. 10, so that some of the cooled air is forced into section C of the cabinet to maintain the contents of the storage cabinet 138 at a low temperature. A thermostat 254 (Fig. 10) is suitably located within the food compartment of section B, and is operative to control the supply of current to the blower motor 240, as will more fully appear from the following description of the wiring diagram, Fig. 11.

If for any reason the mechanical refrigerating unit is ineffective to maintain the sub-zero temperature required in the food compartments of the cabinet, the attendant will be apprised of such condition by suitable indicators (hereinafter described), and may then obtain and insert above the tanks 230 blocks of dry ice, which may be inserted through a door 256 by which access is obtained directly to the interior of the housing 232. When dry ice is thus used as a refrigerating medium, the tanks 230, being filled with a non-freezing liquid, will serve as reasonably good conductors to conduct heat from the air circulated through the circuitous passageways in the tanks, to the dry ice, for evaporating the latter.

Electrical circuits and controls

Figure 11:
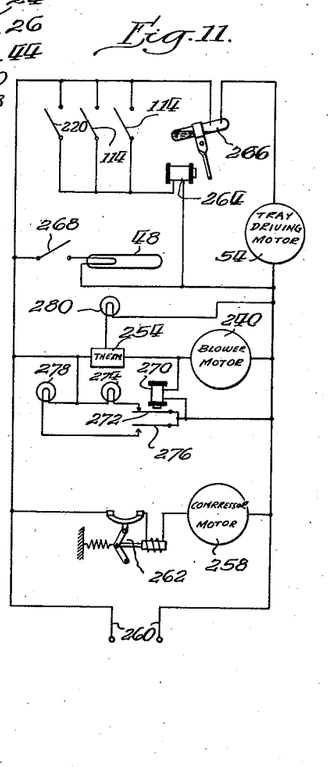
Figure 11 is a wiring diagram showing the circuits for controlling of the operation of the power operated mechanism included in the cabinet.

The mechanical refrigerating unit 226 is, as shown in Fig. 11, provided with a motor 258 which is supplied with current from a suitable power supply line 260, through an overload circuit breaker 262. In addition to the use of the circuit breaker for controlling the operation of the compressor motor, the latter will be controlled by the usual thermostatically operated or pressure operated switches, by which the temperature in the evaporator is maintained at a predetermined low value. Since such controls for refrigerating units are conventional, they are not illustrated in the diagram Fig. 11.

As previously indicated, the two switches 114 and the switch 220 are adapted to control the supply of current to the tray driving motor 54. As will be apparent from Fig. 11, these three switches are connected in parallel, and upon their closure are adapted to energize a relay which has a mercury switch 266 in series with the motor 54. Thus, when any one of the switches 114 or 220 is closed, the driving motor 54 is energized.

The lamp 48 is provided with a switch 268, so that it may be turned off during the period that the cabinet is not being used. The thermostat 254 is connected in series with the blower motor 240, the motor being shunted by the winding of a double acting relay 270.

When the blower motor is being supplied with current, and hence the winding of relay 270 energized, a switch 272 is closed to connect a lamp 274 across the current supply lines 260, whereas when the relay 270 is de-energized, switch 276 is closed to connect a signal lamp 278 across the supply lines 260. The lamps 274 and 278 are preferably located at the end of the cabinet where they may be readily observed by an attendant (as shown in Fig. 1), whereby the attendant may determine whether or not the air circulating blower 238 is in operation. The lamp 278 may be colored blue to indicate that the temperature of the air in the food compartment is below the temperature required, while the lamp 274 may be colored amber to indicate that the blower is in operation and that the temperature is at a safe operating value. In addition, a red colored lamp 280 may be provided and have its circuit closed by the thermostat 254 whenever the temperature within the food compartment of the cabinet rises above a pre-determined value, sufficiently high to indicate that the system is not operating properly.

Operation

In the normal use of the cabinet by retail food supply establishments, frozen foods and other foods required to be kept at a low temperature to preserve their qualities are placed in the trays 32, each tray of a group being packed with a different food product and corresponding signs applied to the faces of the indicators 44. Surplus food received by the retail establishment may be placed in the storage compartment 138.

In normal operation, the refrigerating unit 226 will be connected for continuous operation to maintain the evaporator coils 228 and the surrounding tanks 230 at the required low temperature, while the thermostat 254 will control the supply of current to blower motor 240 and thus control the circulation of air from the food compartment of the cabinet through the circuitous passageways in the tanks 230 until the air in this compartment reaches the required low temperature. The blower 238 is preferably of sufficient volumetric capacity to be capable of completely changing the air contained in the food compartments of the cabinet within a short time, preferably within a minute or so. Thus, even though a plurality of the doors 16 should be simultaneously opened, the air within the cabinet, being in constant circulation, would nevertheless maintain the food products contained in the trays 32 at the required low temperature.

Whenever a customer desires to purchase food products, he will operate either the handle 98 or the handle 99 to cause circuitous movement of a group of trays, until the tray containing the product which he desires to purchase is adjacent the door 16, which he will be able to determine either by watching the indicator 44 or by observing the contents of the trays as they move past the door. When the desired tray is in an accessible position, the customer will release the handle 98 or 99, whereupon the movement of the trays will be arrested and the trays locked in arrested position by means of the engagement of the associated rod 116 with its notched plate 118. Since the contents of the trays are readily visible through the multi-pane window 46, the customer has an opportunity to observe the foods before opening one of the doors 16. By utilizing a single tray for two or more different kinds of foods, it will be readily apparent that the cabinet may be utilized for the storage, display and dispensing of a large number of different kinds of food products.

Whenever the contents of any tray become depleted, it may readily be refilled by replacement from the storage cabinet 138 which, as previously described, may be elevated to render the contents thereof accessible, by operation of the handle 150.

The cabinet, as a whole, is thoroughly insulated, so that the mechanical refrigerating unit may be of relatively small capacity, and operate intermittently. Furthermore, whenever it is desired to use dry ice as the refrigerating medium, the amount of dry ice which may be packed in the housing 232 will be sufficient to maintain the air in the cabinet at the required low temperature for an extended period. In some instances, where dry ice is available at a reasonable cost, it may be used as the refrigerant continuously instead of only during emergencies, and under such circumstances the mechanical refrigerating unit may, of course, be omitted.

While I have shown and described a preferred embodiment of my invention, it will be apparent to those skilled in the art that numerous variations and modifications thereof may be made without departing from the underlying principles thereof. I therefore desire by the following claim to include within the scope of my invention all such modifications and variations as will readily appear to those skilled in the art, by which substantially the results of my invention may be obtained by the utilization of substantially the same or equivalent means.

I claim:

In a refrigerating and display apparatus comprising a cabinet having heat insulating walls, a window formed at the top of said cabinet, said window being formed of a plurality of spaced transparent sheets so as to provide insulation against heat conduction therethrough, doors on opposite sides of said window openable to obtain access to the contents of said chamber, the combination of a plurality of groups of trays, individually controlled means for each group of said trays for moving said trays of a group successively past said window and one of said doors.

LEONARD F. CLERC.